United States Patent
Farmer et al.

(10) Patent No.: US 11,608,752 B2
(45) Date of Patent: Mar. 21, 2023

(54) SEALING APPARATUS FOR AN AXIAL FLOW TURBOMACHINE

(71) Applicant: General Electric Company, Schenectady, NY (US)

(72) Inventors: Jonathon Farmer, Newport, KY (US); Ricardo Caraballo, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/181,765

(22) Filed: Feb. 22, 2021

(65) Prior Publication Data
US 2022/0268167 A1   Aug. 25, 2022

(51) Int. Cl.
  *F01D 11/00* (2006.01)
  *F01D 9/02* (2006.01)
  *F02C 3/06* (2006.01)

(52) U.S. Cl.
  CPC .............. *F01D 11/005* (2013.01); *F01D 9/02* (2013.01); *F02C 3/06* (2013.01); *F05D 2240/128* (2013.01); *F05D 2240/55* (2013.01); *F05D 2250/75* (2013.01)

(58) Field of Classification Search
  CPC .... F01D 11/005; F01D 11/006; F01D 11/008; F01D 9/02
  USPC ........................................ 415/135, 134, 139
  See application file for complete search history.

(56) References Cited

U.S. PATENT DOCUMENTS

| 4,029,436 A | * | 6/1977 | Shoup, Jr. ............. | F01D 11/006 416/193 A |
| 5,154,577 A | * | 10/1992 | Kellock ................ | F01D 11/005 415/134 |
| 5,531,457 A | | 7/1996 | Tibbott et al. | |
| 5,655,876 A | | 8/1997 | Rock et al. | |
| 7,186,078 B2 | | 3/2007 | Tanaka | |
| 7,404,581 B2 | * | 7/2008 | Baving ................ | F16L 33/227 277/626 |

(Continued)

FOREIGN PATENT DOCUMENTS

FR   3080143 A1 * 10/2019 ............ F01D 11/005

OTHER PUBLICATIONS

English translation of FR3080143A1 (Year: 2019).*

*Primary Examiner* — Justin D Seabe
*Assistant Examiner* — Wesley Le Fisher
(74) *Attorney, Agent, or Firm* — Hanley, Flight & Zimmerman, LLC (57) ABSTRACT

A sealing apparatus for an axial flow turbomachine is disclosed. An example axial flow turbomachine includes band segments bordering a flow path, a first spline seal disposed at a first angle within a first slot of the band segments, a second spline seal disposed at second angle within a second slot of the band segments, a Z-seal disposed across a gap between the first slot and the second, the Z-seal positioned at least partially within the first slot and the second slot. The Z-seal includes a first segment disposed at the first angle at least partially within the first slot, the first segment to contact the first spline seal, a second segment disposed at the second angle at least partially within the second slot, a portion of the second segment in connection with a portion of the first segment, the second segment to contact the second spline seal.

19 Claims, 10 Drawing Sheets

(56) References Cited

U.S. PATENT DOCUMENTS

| | | | |
|---|---|---|---|
| 7,625,174 B2* | 12/2009 | Drerup | F01D 11/005 |
| | | | 415/135 |
| 8,075,255 B2* | 12/2011 | Morgan | F02C 7/28 |
| | | | 415/173.1 |
| 8,182,208 B2* | 5/2012 | Bridges, Jr. | F01D 9/041 |
| | | | 277/630 |
| 8,240,985 B2* | 8/2012 | Martin | F01D 11/005 |
| | | | 415/173.1 |
| 8,371,800 B2 | 2/2013 | Meenakshisundaram et al. | |
| 9,238,977 B2 | 1/2016 | Albers et al. | |
| 9,869,194 B2* | 1/2018 | Dev | F16J 15/442 |
| 9,890,651 B2 | 2/2018 | Heaven et al. | |
| 9,945,241 B2 | 4/2018 | Feldmann et al. | |
| 10,030,529 B2 | 7/2018 | Bergman et al. | |
| 10,458,571 B2* | 10/2019 | Vago | F16K 41/083 |
| 10,527,207 B2* | 1/2020 | Manning | F16L 17/08 |
| 2009/0096174 A1* | 4/2009 | Spangler | F01D 11/08 |
| | | | 415/173.1 |
| 2018/0106158 A1 | 4/2018 | Boeke et al. | |
| 2018/0156055 A1 | 6/2018 | Heaven et al. | |

* cited by examiner

SEALING APPARATUS FOR AN AXIAL FLOW TURBOMACHINE

FEDERALLY SPONSORED RESEARCH

This invention was made with United States Government support. The Government has certain rights in the invention.

FIELD OF THE DISCLOSURE

This disclosure relates generally to axial flow turbomachines, and, more particularly, to a sealing apparatus for an axial flow turbomachine.

BACKGROUND

In some configurations, an inner and/or outer band of a flow path of an axial flow turbomachine includes a plurality of segments that guide airflow through the axial flow turbomachine. The inner and/or outer bands are exposed to high temperature combustion gases that cause thermal stress to be applied thereto. The plurality of segments suppress an influence of high temperature combustion gases on the inner and/or outer bands. A seal is placed between each of the plurality of segments to reduce airflow leakage during operation of the axial flow turbomachine.

BRIEF SUMMARY

Sealing apparatus for an axial flow turbomachine are disclosed.

Certain examples provide an axial flow turbomachine including band segments bordering a flow path of the axial flow turbomachine, a first spline seal disposed at a first angle within a first slot of the band segments, a second spline seal disposed at second angle within a second slot of the band segments, a Z-seal disposed across a gap between the first slot and the second slot of the band segments, the Z-seal positioned at least partially within the first slot and the second slot of the band segments. The Z-seal including a first segment disposed at the first angle at least partially within the first slot, the first segment to contact the first spline seal, a second segment disposed at the second angle at least partially within the second slot, a portion of the second segment in connection with a portion of the first segment, the second segment to contact the second spline seal.

Certain examples provide a sealing apparatus including a first sealing element disposed at a first angle, a second sealing element disposed at a second angle, and a third sealing element including a first segment and a second segment, a portion of the first segment in connection with a portion of the second segment, the first segment disposed at the first angle to contact the first sealing element, the second segment disposed at the second angle to contact the second sealing element.

Certain examples provide a sealing apparatus for an axial flow turbomachine including first means for sealing within a first slot, the first slot disposed at a first angle, second means for sealing within a second slot, the second slot disposed at a second angle, and third means for sealing within a gap between the first slot and the second slot, the third means for sealing including a first segment disposed at the first angle and a second segment disposed at the second angle, the first segment positioned at least partially within the first slot to contact the first means for sealing, the second segment positioned at least partially within the second slot to contact the second means for sealing.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Axial flow turbomachines of an aircraft typically include a plurality of segments (e.g., stages, sections, etc.). Primary segments of axial flow turbomachines include a compressor section, a combustor section, and/or a turbine section. Further, the axial flow turbomachines can also include secondary sections within the primary sections. For example, the combustor section can include a plurality of inlet nozzles to pass combustion gases through a plurality of guide vane sections (e.g., nozzle guide vane sections), rotor vane sections, and stator vane sections. Further, the sections can include cooling paths to provide a coolant to select components during operation.

The guide vane sections and/or the stator vane sections of the axial flow turbomachine include inner and outer bands that enclose a flow path. In some implementations, the inner and/or outer bands include a plurality of segments to reduce thermal stress on the guide vane sections and/or the stator vane sections by allowing the inner and/or outer band segments to expand and/or contract without restraint from one another. A seal is implemented between ones of the plurality of segments of the inner and/or outer band to reduce leakage (e.g., air leakage, combustion gas leakage, etc.) during operation of the axial flow turbomachine. However, complexities in the shape of the inner and outer bands and/or the sections thereof result in leakage windows between adjacent seals. The leakage windows reduce a power output, a fuel efficiency and, thus, an overall efficiency of the axial flow turbomachine.

In some implementations, a plurality of straight seals are positioned between segments of the inner band of the axial flow turbomachine. The plurality of straight seals is circumferentially arranged around an interior of the axial flow turbomachine. However, a curvature of the segments of the inner casing introduces leakage windows between the straight seals. Further, a predetermined distance is implemented between adjacent slots for the straight seals to prevent a straight seal from slipping out of an associated slot and into the adjacent slot.

In some implementations, ends of adjacent seals include a spiral and/or curvature to seal off a gap therebetween. However, the spiral and/or curvature guides the air flow to a certain portion of the spiral and/or curvature consistently. Further, the portion of the spiral and/or curvature consistently experiences a significant pressure load that can cause the seal to deform and, thus, increase a size of the leakage window.

Examples disclosed herein provide a sealing apparatus for an axial flow turbomachine. In some examples, the sealing apparatus includes a first spline seal (e.g., a first L-seal, a first sealing element, etc.), a second spline seal (e.g., a second L-seal, a second sealing element, etc.), and a Z-seal (e.g., a third sealing element) disposed between a first segment and a second segment of an inner or outer band of a flow path of the axial flow turbomachine. In some examples, the first segment and the second segment of the inner and/or outer band at least partially encapsulate a stage of stator and/or guide vanes. In some examples, the first segment of the inner and/or outer band encapsulates a turbine nozzle, and the second segment encapsulates the guide vanes. In some examples, the inner and outer bands form an axial flow path through at least a portion of the axial flow turbomachine.

In some examples, the first sealing element is disposed at a first angle within a first slot of an inner or outer band of the axial flow turbomachine. In some examples, the second sealing element is disposed at a second angle within a second slot of the inner or outer band. In some examples, the Z-seal is disposed across a gap between the first slot and the second slot of the inner or outer band. The gap is an area of transition from the first angle of the first slot and the second angle of the second slot. As such, the first slot and the second slot can be in connection while the area of transition from the first angle to the second angle still forms the gap. In some examples, the first slot and the second slot are separated by the gap to prevent the first sealing element and/or the second sealing element from being displaced from their respective slot. In some examples, the first and second sealing elements include a first tab to retain a position thereof within the associated slot. In some examples, the first and second sealing elements include a second tab to prevent contact between adjacent sealing elements. In some examples, the second tab of the first sealing element aligns with the second tab of the second sealing element.

In some examples, a first segment of the Z-seal is disposed at the first angle at least partially within the first slot. In some examples, a second segment of the Z-seal is disposed at the second angle at least partially within the second slot. In some examples, the Z-seal is a nickel-based alloy or a cobalt-based alloy that is manufactured based on the angles of the first slot and the second slot and the gap therebetween. Further, a portion of the first segment of the Z-seal and a portion of the second segment of the Z-seal contact the first spline seal and the second spline seal, respectively. In some examples, the Z-seal is thin enough (e.g., 0.003-0.025 inches thick, etc.) to fit in the first slot and/or the second slot along with the spline seal. During operations of the axial flow turbomachine, the first spline seal conforms to a sealing surface (e.g., an inner surface, an outer surface, etc.) of the first slot, the second spline seal conforms to a sealing surface of the second slot, and the Z-seal conforms to a sealing surface of the gap in response to a pressure load.

In some examples, the Z-seal minimizes or otherwise reduces a leakage window introduced by the gap. For example, the Z-seal provides a continuous seal between the first angle of the first spline seal and the second angle of the second spline seal. Accordingly, the Z-seal provides a seal within the inner and/or outer band where a curvature, and/or other complex geometry, of the segments of the inner or outer band introduces a potential leakage window. Further, the Z-seal increases control of the spline seals by retaining the spline seals within the associated slots.

Figure 1:
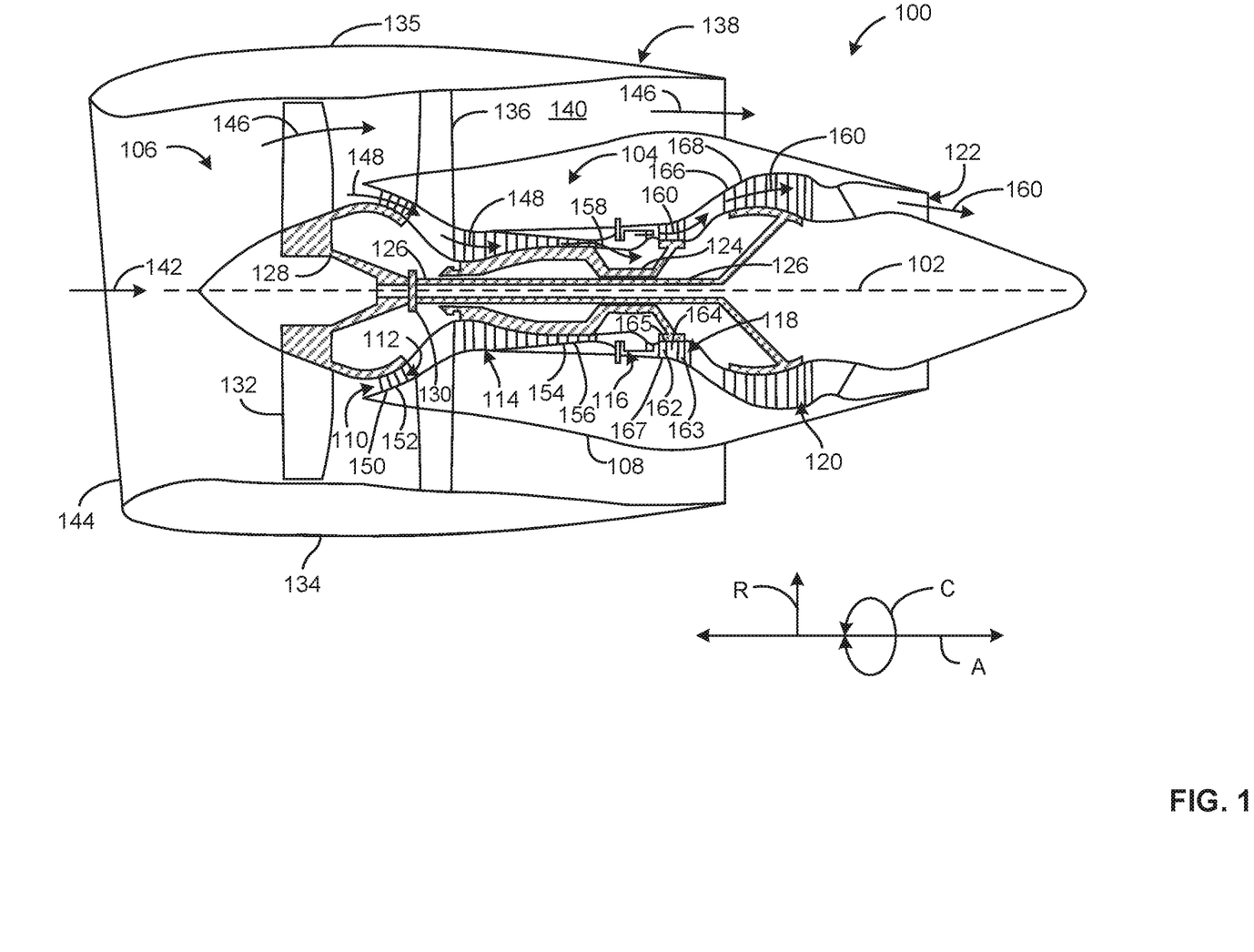
FIG. 1 is a schematic cross-sectional view of a first example high-bypass turbofan-type gas turbine engine.

Referring now to the drawings, wherein identical numerals indicate the same elements throughout the figures, FIG. 1 is a schematic cross-sectional view of an example axial flow turbomachine 100 that may incorporate various examples disclosed herein. As shown in FIG. 1, the axial flow turbomachine 100 defines a longitudinal or axial centerline axis 102 extending therethrough for reference. In general, the axial flow turbomachine 100 can include a core turbine or gas turbine engine 104 disposed downstream from a fan section 106.

The core turbine engine 104 can generally include a substantially tubular outer casing 108 that defines an annular inlet 110. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (i.e., a direct-drive configuration). In alternative configurations, the LP shaft 126 may couple to the fan shaft 128 via a reduction gear 130 (i.e., an indirect-drive or geared-drive configuration).

As shown in FIG. 1, the fan section 106 includes a plurality of fan blades 132 ("fan" 132) coupled to and extending radially outwardly from the fan shaft 128. A first annular fan casing or first nacelle 134 circumferentially encloses the fan section 106 and/or at least a portion of the core turbine 104. The axial flow turbomachine 100 includes a second nacelle 135 opposite the first nacelle 134. The nacelles 134, 135 can be supported relative to the core turbine 104 by a plurality of circumferentially-spaced apart outlet vanes 136. Furthermore, a downstream section 138 of the nacelles 134, 135 can enclose an outer portion of the core turbine 104 to define a bypass airflow passage 140 therebetween.

As illustrated in FIG. 1, air 142 enters an intake or inlet portion 144 of the axial flow turbomachine 100 during operation thereof. A first portion 146 of the air 142 flows into the bypass flow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where at least one fuel nozzle 162 mixes fuel with the compressed air 158, which burns to provide combustion gases 160. The at least one fuel nozzle 162 is coupled to an inner band 165 and an outer band 167 of a flow path of the combustion gases 160. The inner band 165 and the outer band 167 include segments that surround the core turbine 104. In some examples, the at least one fuel nozzle 162 is associated with a nozzle guide vane(s) to guide the combustion gases 160 through the HP turbine 118.

The combustion gases 160 flow through the HP turbine 118 where one or more sequential stages of HP turbine stator vanes 163 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the axial flow turbomachine 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelles 134, 135. In each of the turbofan, turbojet, and unducted engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the axial flow turbomachine 100 defines an axial direction A, a radial direction R, and a circumferential direction C. In general, the axial direction A extends generally parallel to the axial centerline axis 102, the radial direction R extends orthogonally outwardly from the axial centerline axis 102, and the circumferential direction C extends concentrically around the axial centerline axis 102.

In some examples, the inner band and the outer band include segments (e.g., circumferential segments) that border the flow path of the combustion gases 160. As a result, a thermal expansion or contraction of the inner and/or outer band is isolated to discrete segments, which reduces thermal stress on the inner or outer band that results from differential thermal expansion and contraction.

In some examples, a seal(s) is disposed along the circumferential direction C between segments of inner and/or outer bands in connection with the at least one fuel nozzle 162, the associated HP turbine guide vanes, and/or the HP turbine stator vanes 163. In some such examples, the seal(s) reduce a leakage window between segments of inner and/or outer bands to prevent the air 142 and/or the combustion gases 160 from exiting the axial flow path. Further, maintaining a maximum volume flow of the air 142 and/or the combustion gases 160 in the axial direction A by reducing any leakage increases an overall efficiency of the axial flow turbomachine 100.

Figure 2A:
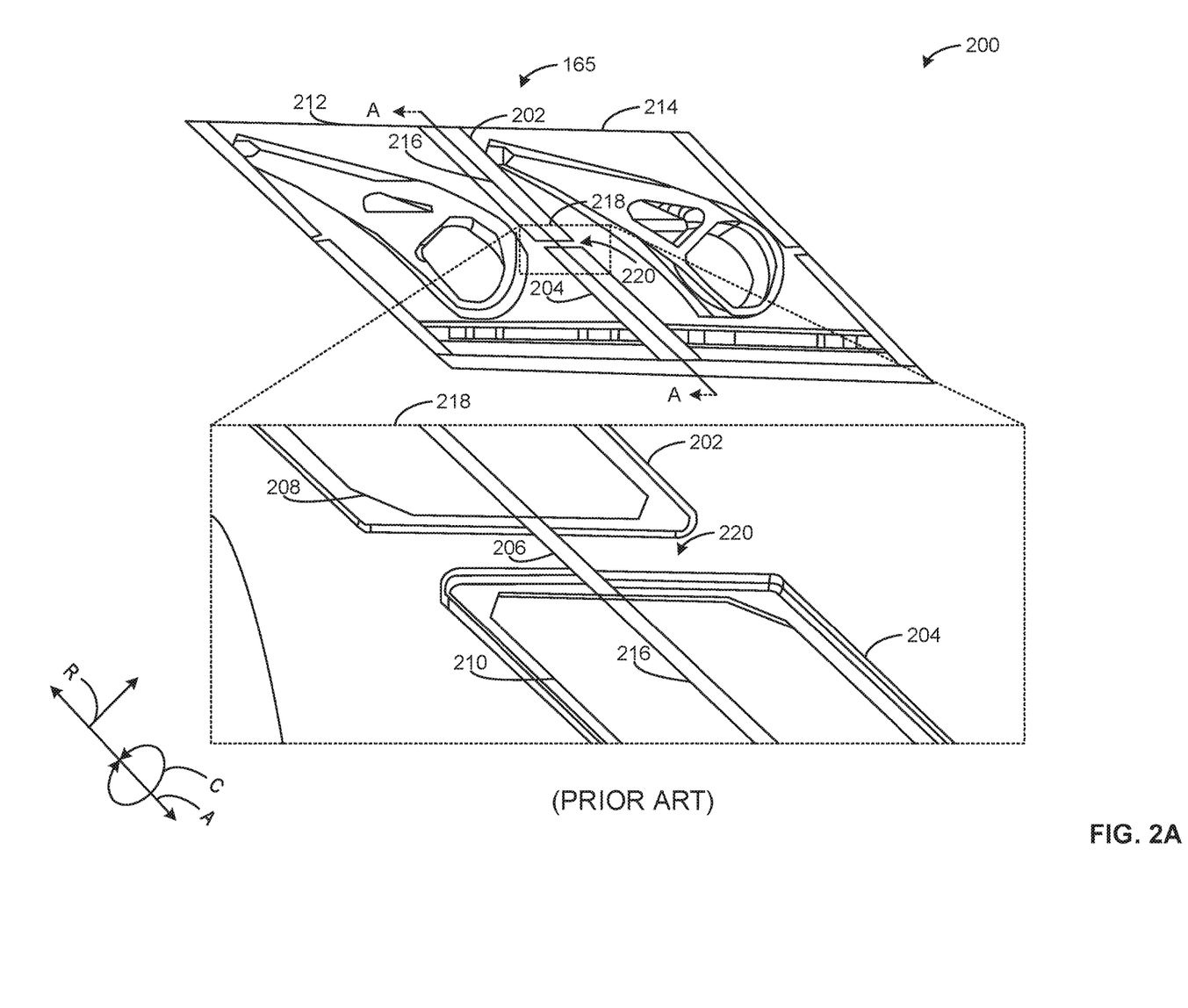
FIGS. 2A-B illustrate prior art of a seal implemented in an example inner or outer band of a flow path of an axial flow turbomachine.

FIG. 2A illustrates a top-down view of a prior art seal 200 of an inner band 165 associated with the at least one fuel nozzle 162 and/or the associated guide vanes of the axial flow turbomachine 100. In some examples, the prior art seal 200 is implemented between segments of the inner band 165 in connection with the at least one fuel nozzle 162 and/or the associated inlet nozzle guide vanes. In FIG. 2A, the inner band 165 includes a first slot 202 disposed at first angle, a second slot 204 disposed at a second angle, and a ligament 220 therebetween. In FIG. 2A, the inner band 165 also includes a first segment of the inner band 212, a second segment of the inner band 214, and a space (e.g., a separation, a slot, etc.) 216 therebetween. In FIG. 2A, the prior art seal 200 includes a first straight seal 208 disposed at the first angle in the first slot 202, a second straight seal 210 disposed at the second angle in the second slot 204, and a ligament (e.g., a portion of the first segment of the inner band 212, a portion of the second segment of the inner band 214) 220 disposed therebetween. In FIG. 2A, the first straight seal 208, the second straight seal 210, and the gap 206 are positioned between the first segment of the inner band 212 and the second segment of the inner band 214. In some examples, the inner band 165 includes a plurality of the straight seals 208, 210 positioned along the circumferential direction C in the axial flow turbomachine 100. As such, the inner band 165 forms an inner border for the flow path of the combustion gases 160. Additionally, an outer band forms an outer border of the flow path of the combustion gases 160.

In FIG. 2A, a leakage between segments of the inner band 165 or the outer band reduces an efficiency of the axial flow turbomachine 100.

In FIG. 2A, a magnified view 218 of the inner band 165 illustrates the ligament 220 and the gap 206 between the first slot 202 and the second slot 204 that separates the first straight seal 208 and the second straight seal 210. In FIG. 2A, the gap 206 is disposed within the space 216 between longitudinal ends of the first straight seal 208 and the second straight seal 210. In some examples, the ligament 220 includes a portion of the first segment of the inner band 212 and a portion of the second segment of the inner 214 separated by the gap 206.

In FIG. 2A, the dissimilar angles of the first and second straight seals 208, 210 can form a leakage window that permits air 142 and/or combustion gases 160 to escape from the inner band 165. Specifically, the longitudinal ends of the straight seals 208, 210 are unable to mesh due to the dissimilar angles, which form the gap 206 and allow leakage between the first and second segments of the inner band 212, 214. In example operating conditions, any movement of the first segment of the inner band 212 relative to the second segment 214 can shift an angle that the ligament 220 is disposed at, which also increases the size of the gap 206 and, thus, the leakage window. In some examples, the gap 206 permits the air 142 to flow in the radial direction R as opposed to the axial flow direction A. Accordingly, the limitations of the ligament 220 reduce the overall efficiency of the axial flow turbomachine 100 during operation thereof.

Figure 2B:
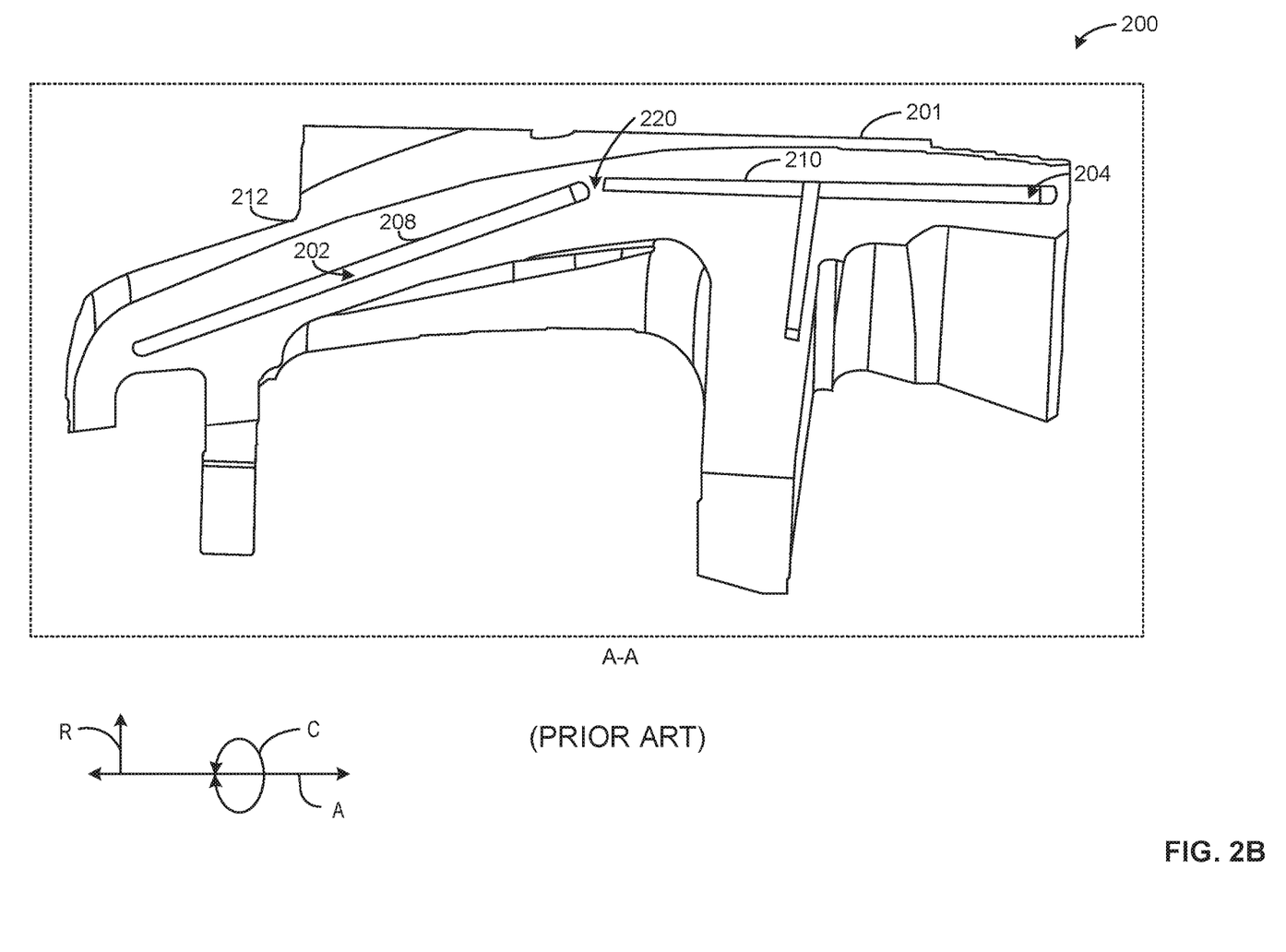

FIG. 2B illustrates a cross-section A-A of the prior art seal 200 of the inner band 165 of the axial flow turbomachine 100 of FIG. 2A. In FIG. 2B, the cross section A-A illustrates the prior art seal 200 within the first segment of the inner band 212. In FIG. 2B, the first segment of the inner band 212 includes the first slot 202 disposed at the first angle and the second slot 204 disposed at the second angle. In FIG. 2B, the first slot 202 and the second slot 204 are separated by the ligament 220. In FIG. 2B, the first straight seal 208 is disposed in the first slot 202 and the second straight seal 210 is disposed in the second slot 204.

In FIG. 2B, the first slot 202 and the second slot 204 are separated by a predetermined minimum distance (e.g., the ligament 220) to prevent the first straight seal 208 from moving into the second slot 204 and/or the second straight seal 210 from moving into the first slot 202. In some examples, the separation introduces a leakage window (e.g., the gap 206) at a transition between the first angle of the first slot 202 and the second angle of the second slot 204. In some examples, the leakage window of the gap 206 permits the combustion gases 160 and/or the air 142 to escape between the first and second segments of the inner band 212, 214 that enclose the flow path of the combustion gases 160. Further, the leakage window reduces a power output, a fuel efficiency, and/or an overall efficiency of the axial flow turbomachine 100.

Figure 3A:
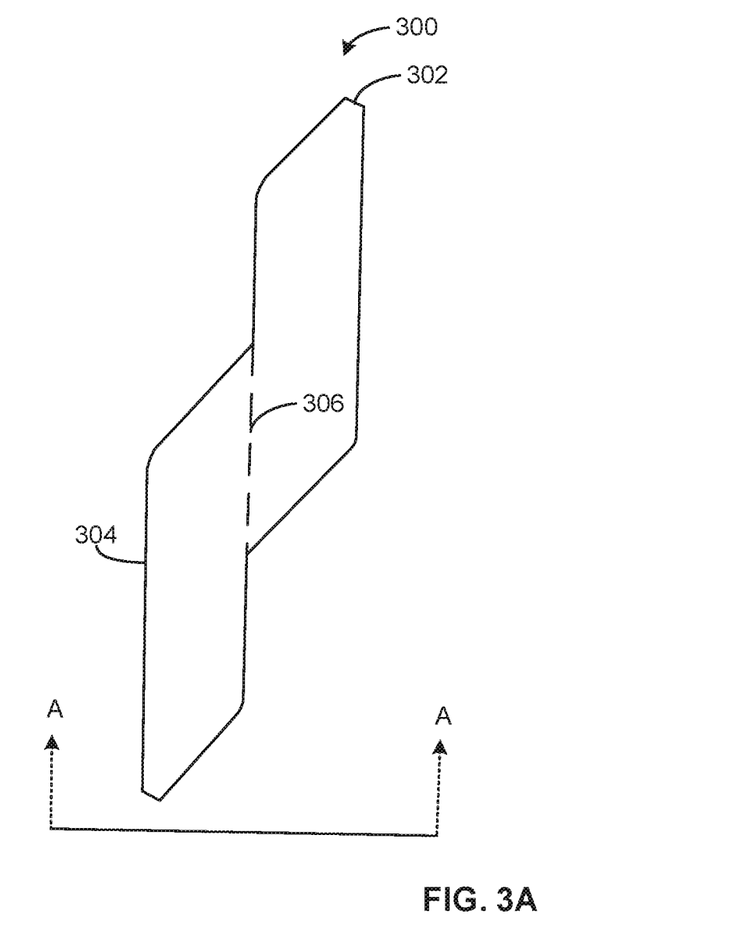
FIGS. 3A-B illustrate an example Z-seal of the example axial flow turbomachine of FIG. 1.

To remedy the leakage window introduced by the prior seals 208, 210 and improve air flow to increase the power output, the fuel efficiency, and/or the overall efficiency of the axial flow turbomachine 100 while reducing air leakage, certain examples provide an improved seal for the band segments (e.g., segments of the inner band 165, segments of the outer band 167, etc.) of the HP turbine nozzle 162, the associated inlet nozzle guide vanes, and/or the HP turbine stator vanes 163. FIG. 3A illustrates an example Z-seal 300 to be implemented within the example axial flow turbomachine 100 of FIG. 1. In FIG. 3A, the Z-seal 300 includes a first segment 302 disposed at the first angle of the first slot 202 and a second segment 304 disposed at the second angle of the second slot 204. In some examples, the Z-seal 300 is positioned within a slot that includes complex geometry, such as a bend and/or curvature, to seal a leakage window where separate seals are unable to mesh. In some examples, the first segment 302 is positioned at least partially within a first slot (e.g., a slot positioned at a first angle, etc.), and the second segment 304 is positioned at least partially in a second slot (e.g., a slot positioned at a second angle, etc.) of a band segment of HP turbine nozzle 162 and/or the HP turbine stator vanes 163. In some such examples, the first segment 302 is in contact (e.g., meshes, engages, etc.) with a first spline seal, and the second segment 304 is in contact (e.g., meshes, engages, etc.) with a second spline seal, as discussed further in association with FIG. 5. In FIG. 3A, the Z-seal 300 includes a midsection 306 between the first segment 302 and the second segment 304. In some examples, the midsection 306 is a transition area between the first angle of the first segment 302 and the second angle of the second segment 304. In some examples, the Z-seal 300 includes a nickel-based alloy and/or a cobalt-based alloy, which are high temperature capable alloys that can enclose the flow path of the high temperature combustion gases 160 without being damaged. In some examples, a material of the Z-seal 300 depends on an area of implementation and temperatures encountered in the area.

Figure 3B:
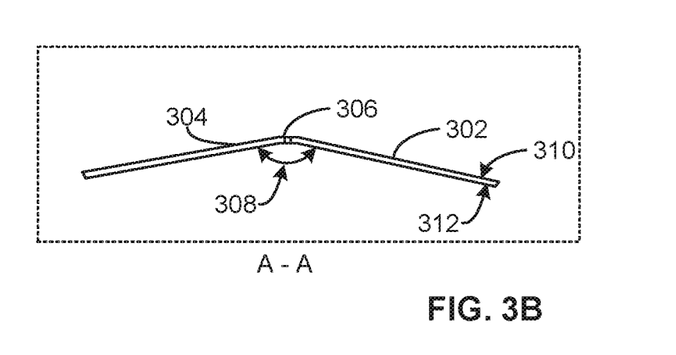

FIG. 3B illustrates a cross-section A-A of the Z-seal 300. In FIG. 3B, the midsection 306 of the Z-seal 300 includes an angle 308 between the first segment 302 and the second segment 304. In some examples, the angle 308 is determined based on a difference between the first angle of the first slot and the second angle of the second slot. In FIG. 3B, the Z-seal 300 includes a first surface (e.g., an outer surface) 310 and a second surface (e.g., an inner surface) 312 separated by a relatively small thickness. In some examples, the first and second segments 302, 304 are positioned in a first slot and a second slot, respectively, along with a spline seal. In some examples, an area of the midsection 306 is based on a radius of the angle 308.

Figure 4A:
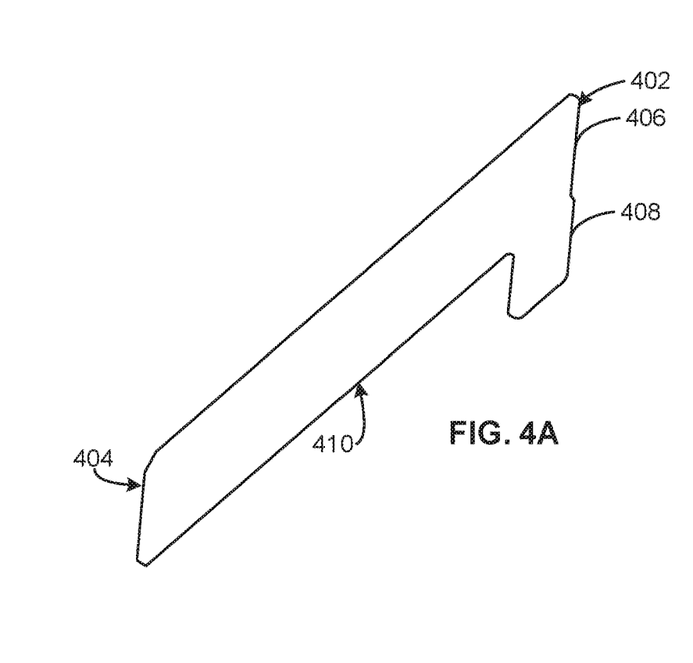
FIGS. 4A-B illustrate an example spline seal of the example axial flow turbomachine of FIG. 1.
Figure 4B:
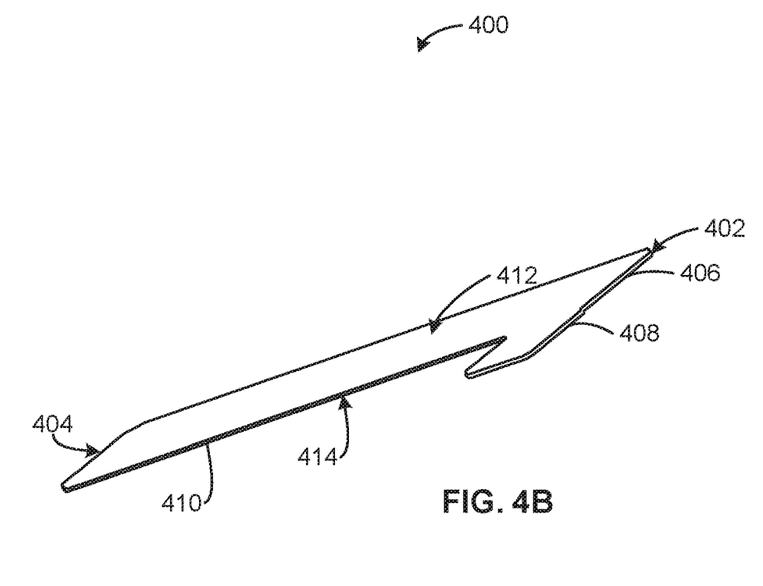

FIGS. 4A-B illustrate a spline seal 400 to be implemented within the axial flow turbomachine 100 of FIG. 1. In FIGS. 4A-B, the spline seal 400 includes a first longitudinal end 402 and a second longitudinal end 404 to be positioned within a slot(s) between a first band segment and a second band segment. In FIGS. 4A-B, the first longitudinal end 402 of the spline seal 400 includes an alignment tab 406 and a retaining tab 408. In FIGS. 4A-B, the retaining tab 408 protrudes from a side 410 of the spline seal 400 at the first longitudinal end 402. In FIGS. 4A-B, the spline seal 400 also includes a first surface (e.g., an outer surface) 412 and a second surface (e.g., an inner surface) 414 opposite the first surface 412.

In FIGS. 4A-B, a longitudinal distance between an end of the retaining tab 408 and the second longitudinal end 404 is greater than a longitudinal distance between an end of the alignment tab 406 and the second longitudinal end 404. In other words, the retaining tab 408 extends farther in a longitudinal direction than the alignment tab 406.

In some examples, the alignment tab 406 aligns the spline seal 400 with an adjacent spline seal and/or the Z-seal 300. For example, the alignment tab 406 aligns with, and/or is parallel to, an end of the associated slot and an adjacent slot. In some examples, the slot for the spline seal 400 includes a section (e.g., a dog-leg section, a bend, etc.) for the retaining tab 408 to be inserted within. In some such examples, the retaining tab 408 retains a position of the spline seal 400 within the associated slot and, thus, prevents the spline seal 400 from shifting into the adjacent slot between the slots under pressure loads.

Figure 5:
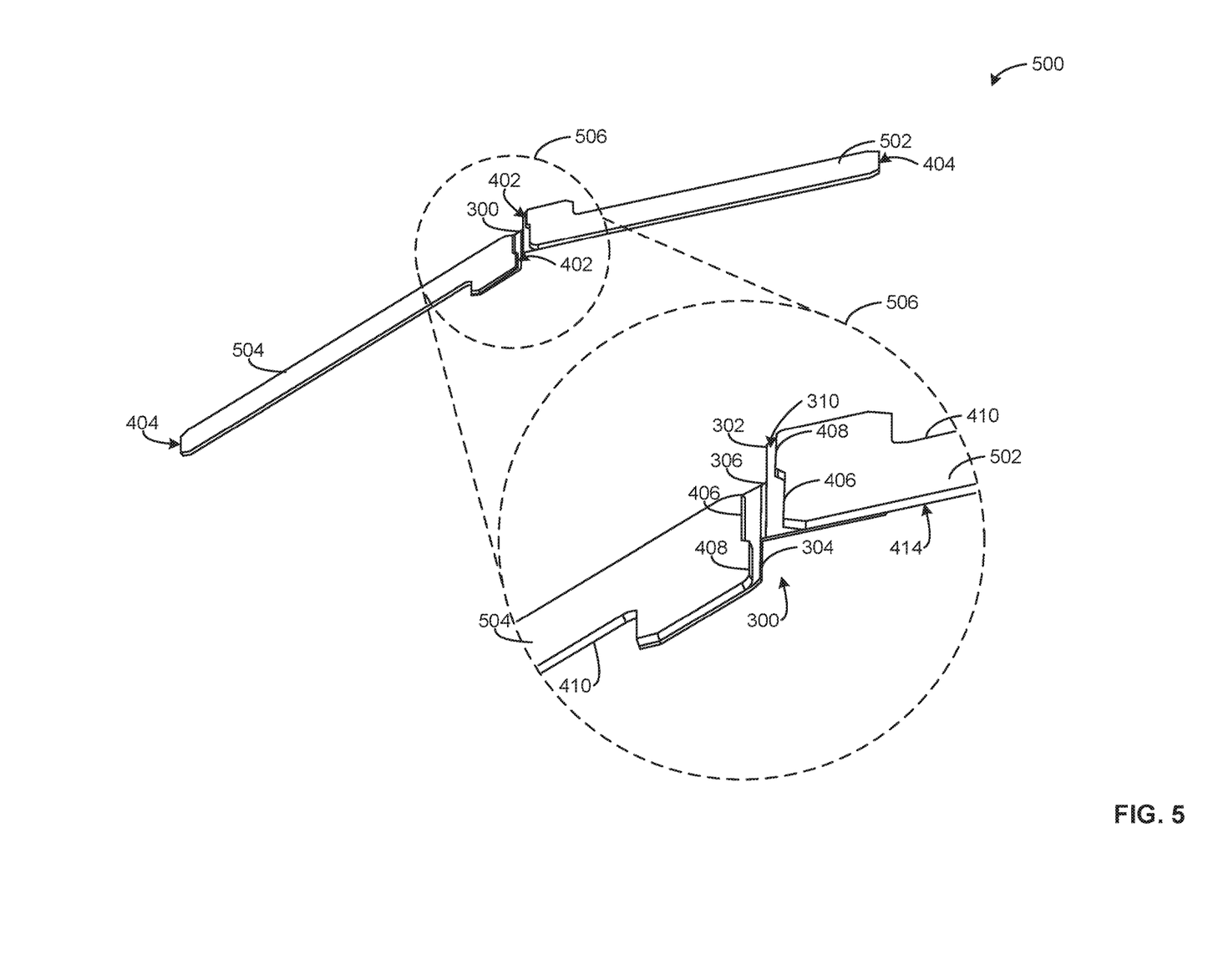
FIG. 5 illustrates the example Z-seal of FIGS. 3A-B and the example spline seals of FIGS. 4A-B of the axial flow turbomachine of FIG. 1.

FIG. 5 illustrates an assembly 500 of the Z-seal 300 of FIGS. 3A-B incorporated between ones of the spline seal 400 of FIGS. 4A-B. In some examples, the assembly 500 is implemented between band segments (e.g., segments of the inner band 165, segments of the outer band 167, etc.) bordering a flow path of the axial flow turbomachine, as discussed further in association with FIGS. 6, 7, 8, and/or 9. In FIG. 5, the assembly 500 includes a first spline seal (e.g., a first sealing element) 502, a second spline seal (e.g., a second sealing element) 504, and the Z-seal (e.g., a third sealing element) 300. In FIG. 5, a contact area 506 shows a magnified view of the Z-seal 300 positioned between the first spline seal 502 and the second spline seal 504.

In FIG. 5, the first longitudinal end 402 of the first spline seal 502 overlaps and/or is in contact with the first segment of the Z-seal 302 and the first longitudinal end 402 of the second spline seal 504 overlaps and/or is in contact with the second segment of the Z-seal 304. In some examples, the outer surface 310 of the first and second segments of the Z-seal 302, 304 is in contact with the inner surface 414 of the first and second spline seals 502, 504, respectively. In some examples, the first spline seal 502 and the first segment of the Z-seal 302 are disposed at a first angle to seal a first slot. In some such examples, the second spline seal 504 and the second segment of the Z-seal 304 are disposed at a second angle to seal a second slot. In some examples, the Z-seal 300 provides a connection between the first slot and the second slot to seal a gap therebetween. As a result, the Z-seal 300 minimizes or otherwise reduces a leakage of the air 142 and/or the combustion gases 160 between the first and second spline seals 502, 504. Further, the overlap between the first spline seal 502 and the first segment of the Z-seal 302 and the overlap between the second spline seal 504 and the second segment of the Z-seal 304 provides a continuous seal across complex geometries. In some examples, the continuous seal eliminates and/or otherwise reduces leakage windows that can occur between adjacent edges of seals (e.g., within the gap 206 between the first straight seal 208 and the second straight seal 210).

In FIG. 5, the retaining tabs 408 of the first and second spline seals 502, 504 are positioned outside the midsection of the Z-seal 306 on opposite ends thereof to be inserted within the bend of an associated slot(s) of the band segment. In some examples, the retaining tabs 408 restrict the first and second spline seals 502, 504 from sliding out of the associated slot(s). In some such examples, the retaining tabs 408 permit the first and second spline seals 502, 504 to be placed close together (e.g., within 0.02 inches (in) depending on an area of implementation). As such, permitting the first and second spline seals 502, 504 to be placed close together minimizes or otherwise reduces a leakage window that can be introduced by a gap (e.g., the gap 206) therebetween. As a result, the leakage window is reduced to approximately 5-10% of the leakage provided by the prior art seal 200. In FIG. 5, a width of the first or second segment of the Z-seal 302, 304 matches a width of the alignment tab 406 in addition to the retaining tab 408 plus or minus 0.01 in. Accordingly, portions of the first and second segments of the Z-seal 302, 304 are also inserted within the bend of the associated slots to retain a position of the Z-seal 300.

Figure 6:
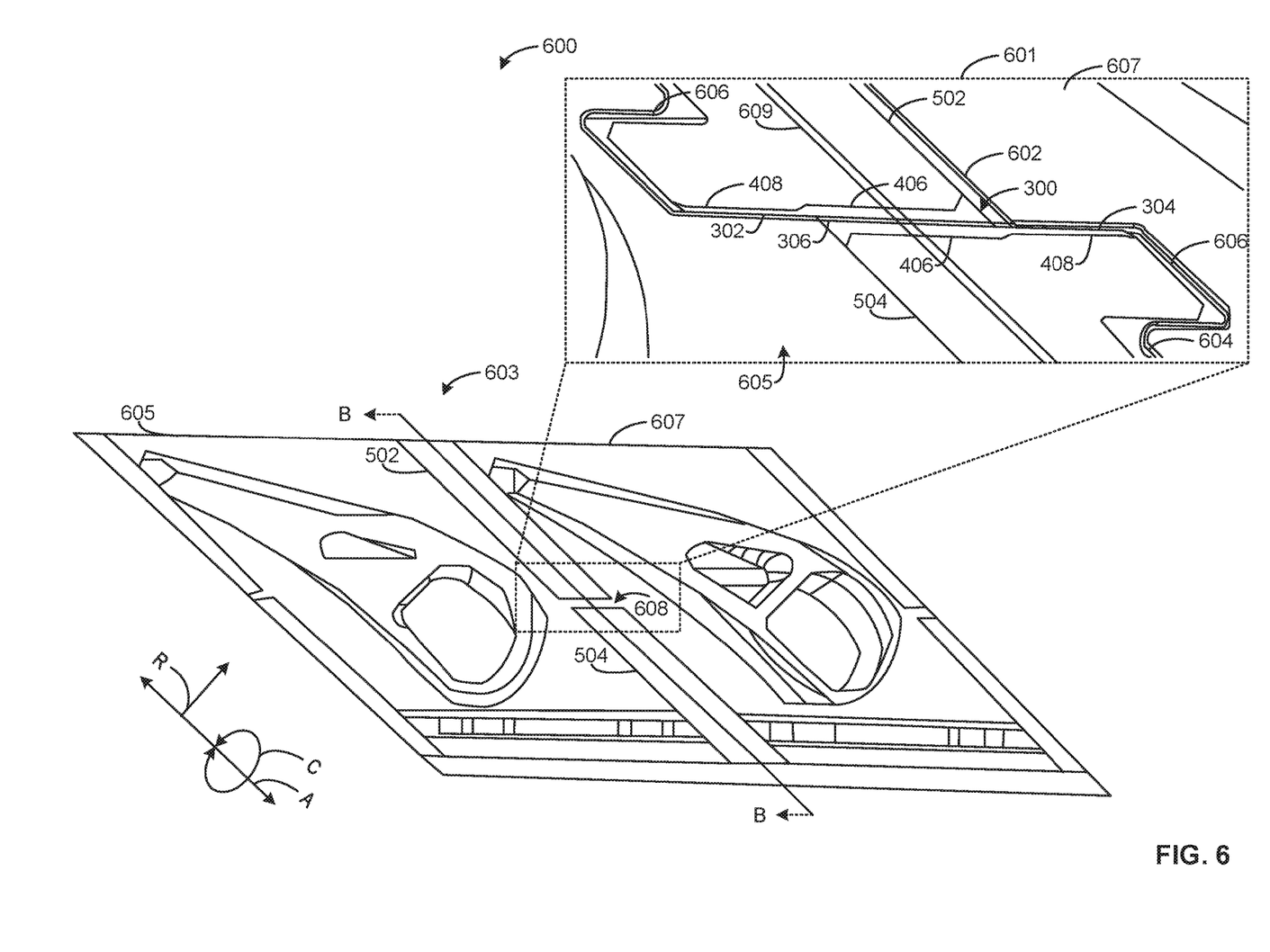
FIG. 6 illustrates a first view of an example implementation of the example Z-seal of FIGS. 3A-B and/or 5 and the example spline seals of FIGS. 4A-B and/or 5 in an example inner or outer band of a flow path of the axial flow turbomachine of FIG. 1.

FIG. 6 illustrates a first view (e.g., a top-down view) 600 of an implementation of the Z-seal 300 and the spline seals (e.g., the spline seal 400) 502, 504 in band segments 603 (e.g., segments of the inner and/or outer band 165, 167) bordering a flow path of the axial flow turbomachine 100. In FIG. 6, a magnified view 601 of the band segments 603 includes a first band segment (e.g., a first inner band segment or outer band segment) 605, a second band segment (a second inner band segment or outer band segment) 607, and a space 609 therebetween. In FIG. 6, the band segments 603 include the first spline seal 502 disposed at a first angle within a first slot 602 and the second spline seal 504 disposed at a second angle within a second slot 604 between the first band segment 605 and the second band segment 607. In FIG. 6, the band segments 603 further include the Z-seal 300 within a space 608 between the first slot 602 and the second slot 604. In FIG. 6, the slots 602, 604 of the band segments 603 and the space 608 between the slots 602, 604 differ from the slots 202, 204 and the gap 206 of the inner band 165 shown in FIG. 2. In FIG. 6, the first segment of the Z-seal 302 is positioned at the first angle at least partially within the first slot 602 to contact the first spline seal 502. Accordingly, the second segment of the Z-seal 304 is positioned at the second angle at least partially within the second slot 604 to contact the second spline seal 504. In FIG. 6, the first and second slots 602, 604 include a bend 606 at a longitudinal end thereof.

In FIG. 6, the retaining tabs 408 of the first and second spline seals 502, 504 are positioned within the bend 606 of the first and second slots 602, 604, respectively. In some examples, the retaining tab 408 of the first and second spline seal 502, 504 extends farther along the axial direction A than the alignment tab 406 to contact a wall of the bend 606 and retain a position of the first and second spline seal 502, 504 in the first and second slot 602, 604, respectively. In some examples, the alignment tab 406 does not extend as far as the retaining tab 408 because there is no wall between the alignment tab 406 and the space 608. Further, shorter extension of the alignment tab 406 reduces a chance of the first or second spline seal 502, 504 shifting into the space 608 and, thus, prevents contact between the first and second spline seals 502, 504 and/or displacement thereof. In some examples, the alignment tab 406 of the first spline seal 502 aligns with the alignment tab 406 of the second spline seal 504. For example, the alignment tab 406 of the first spline seal 502 is substantially parallel to the alignment tab 406 of the second spline seal 504 in the circumferential direction C.

In FIG. 6, the Z-seal 300 is positioned at least partially underneath the first and second spline seals 502, 504. For example, the first and second segments of the Z-seal 302, 304 are positioned at least partially between (1) the alignment and retaining tabs 406, 408 of the first and second spline seals 502, 504 and (2) an interior surface of the band segments 603 or the combustion gases 160. In some examples, the first and second segments of the Z-seal 302, 304 are positioned partially within the bend 606 of the first and second slot 602, 604 to retain a position of the Z-seal 300. During operating conditions, the first spline seal 502, the second spline seal 504, and the Z-seal 300 provide a seal between the first band segment 605 and the second band segment 607, which include curvature. In some examples, the Z-seal 300 and the first and second spline seals 502, 504 conform to a surface of the band segments 603 under pressure loads to provide a continuous seal during operations of the axial flow turbomachine 100.

Figure 7:
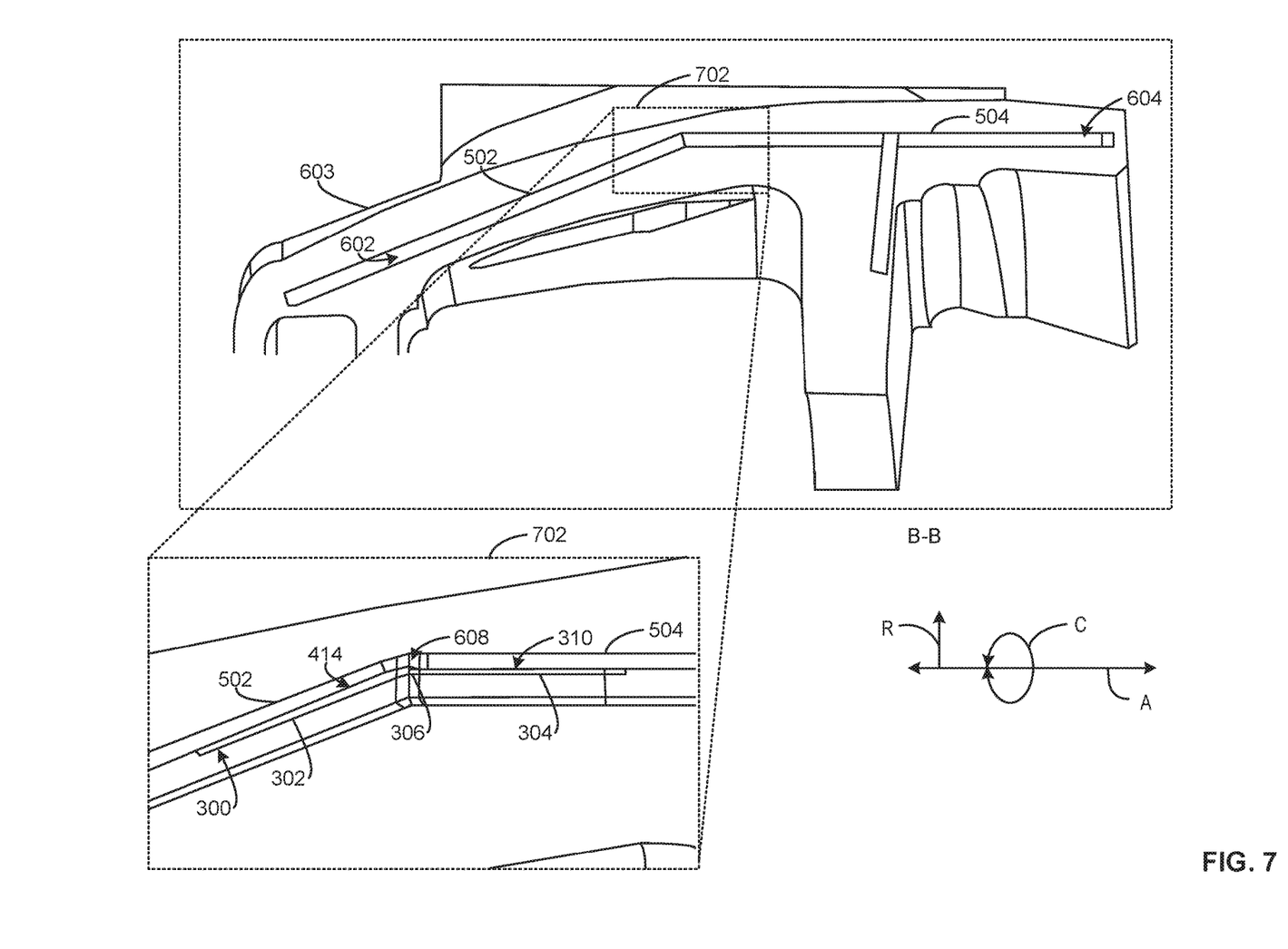
FIG. 7 illustrates a second view of the example implementation of the example Z-seal of FIGS. 3A-B, 5 and/or 6 and the example spline seals of FIGS. 4A-B, 5 and/or 6 in the example inner or outer band of the flow path of the axial flow turbomachine of FIG. 6.

FIG. 7 illustrates a cross-section B-B of the implementation of the Z-seal 300 and the spline seals 502, 504 in the band segments 603 of the axial flow turbomachine 100 shown in FIG. 6. In FIG. 7, the cross section B-B illustrates a first angle at which the first spline seal 502 is disposed and a second angle at which the second spline seal 504 is disposed. In FIG. 7, a magnified view of a transition area 702 between the first angle of first slot 602 and the second angle of the second slot 604 is shown.

In FIG. 7, the first segment of the Z-seal 302 is disposed at the first angle underneath the first spline seal 502 and the second segment of the Z-seal 304 is disposed at the second angle underneath the second spline seal 504. In FIG. 7, the Z-seal 300 provides a connection between the first spline seal 502 in the first slot 602 and the second spline seal 504 in the second slot 604 to minimize a leakage area of the space 608 therebetween. In FIG. 7, the midsection 306 and portions of the first segment 302 and the second segment 304 of the Z-seal 300 seal the space 608. As such, the Z-seal 300 prevents the air 142 and/or combustion gases 160 from escaping in the radial direction R between the first and second band segments 605, 607 by sealing a complex geometry between the first slot 602 and the second slot 604. Further, the outer surface of the Z-seal 310 engages with the inner surface 414 of the first and second spline seals 502, 504. Specifically, an area of the outer surface 310 of the first and second segments of the Z-seal 302, 304 engages with an area of the inner surface 414 of the alignment tab 406 and the retaining tab 408 of the first and second spline seals 502, 504 to eliminate or otherwise reduce leakage that occurs as a result of a transition between adjacent seals. Further, an engagement between areas of the outer surface 310 of the Z-seal 300 and the inner surface 414 the first and second spline seals 502, 504 provides a greater sealing capability under pressure loads compared to an engagement between edges of the seals, as shown in the prior art seal 200. As such, the engagement maintains a greater volume flow of the air 142 and/or the combustion gases 160 in the axial direction A of the flow path regardless of slight movements between the Z-seal 300, the spline seals 502, 504, and/or the band segments 605, 607. In some examples, the Z-seal 300 reduces the leakage to 5-10% of a leakage that occurs with the prior art seal 200.

Figure 8:
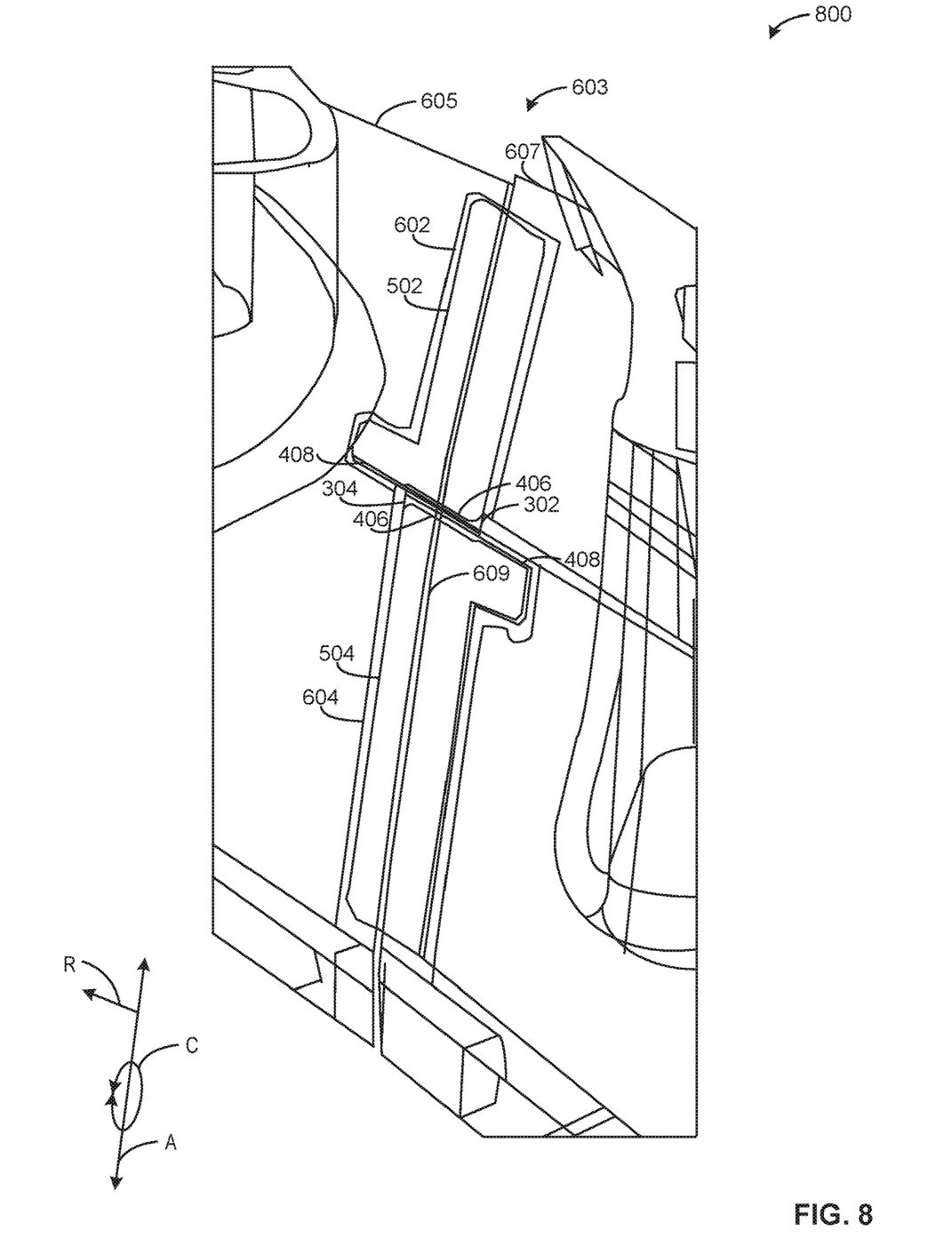
FIG. 8 illustrates a third view of the example implementation of the example Z-seal of FIGS. 3A-B, 5, 6, and/or 7 and the example spline seals of FIGS. 4A-B, 5, 6, and/or 7 in the example inner or outer band of the flow path of the axial flow turbomachine of FIGS. 6 and/or 7.

FIG. 8 illustrates a first side-view 800 of the implementation of the Z-seal 300 and the spline seals 502, 504 shown in the band segments 603 of the axial flow turbomachine 100 of FIGS. 6 and/or 7. In FIG. 8, the side view 800 is of an exterior of the band segments 603 the axial flow turbomachine 100. In FIG. 8, the alignment tab 406 and the retaining tab 408 of the first spline seal 502 overlap the first segment of the Z-seal 302. Further, the alignment tab 406 and the retaining tab 408 of the second spline seal 504 overlap the second segment of the Z-seal 304. In example operations, the first spline seal 502, the second spline seal 504, and the Z-seal 300 conform to a sealing surface of the first slot 602, the second slot 604, and the space 608, respectively to prevent the air 142 and/or combustion gases 160 from escaping via the space 609 between the first band segment 605 and the second band segment 607.

Figure 9:
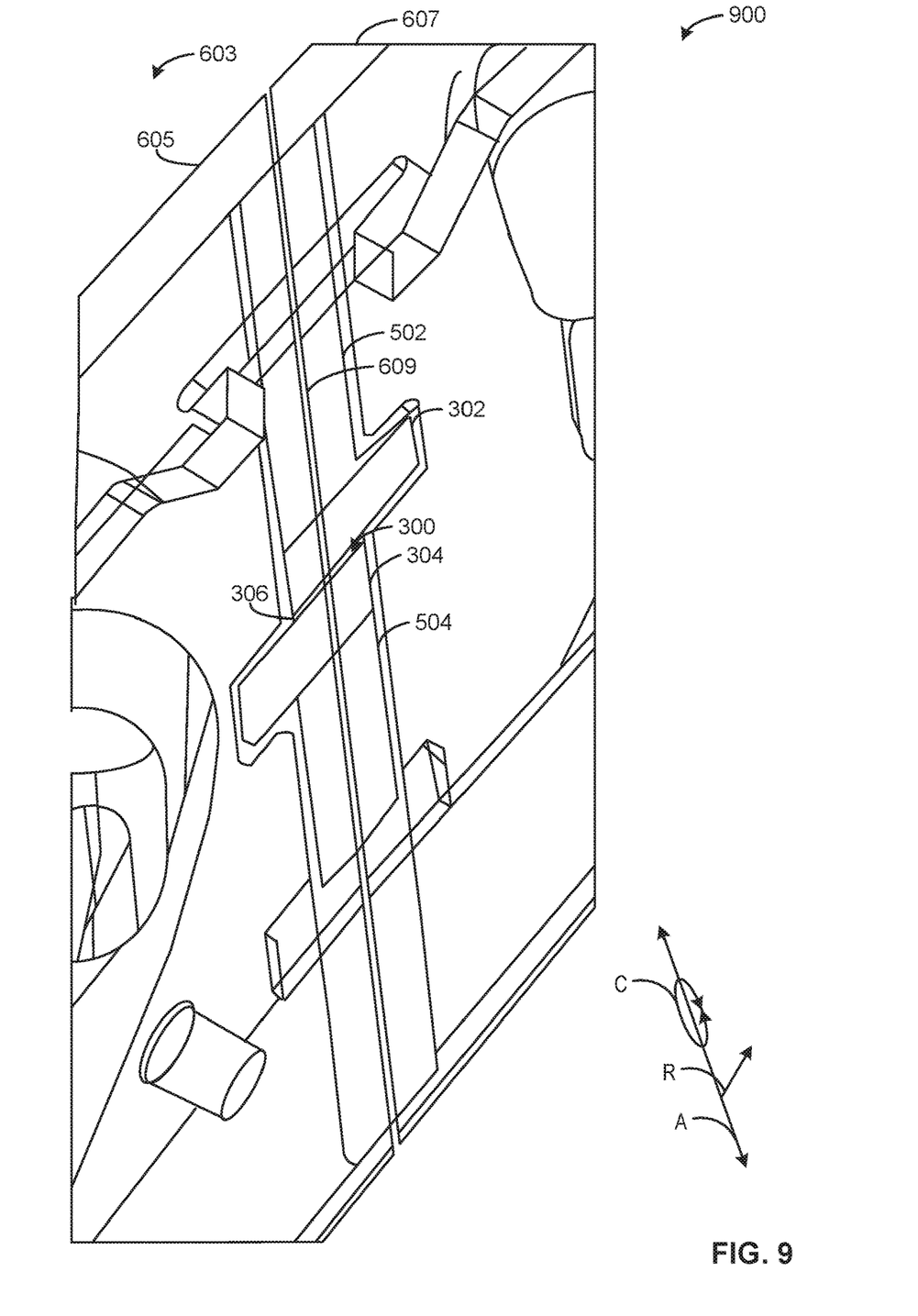
FIG. 9 illustrates a fourth view of the example implementation of the example Z-seal of FIGS. 3A-B, 5, 6, 7 and/or 8 and the example spline seals of FIGS. 4A-B, 5, 6, 7, and/or 8 in the example inner or outer band of the flow path of the axial flow turbomachine of FIGS. 6, 7, and/or 8.

FIG. 9 illustrates a second side view 900 of the implementation of the Z-seal 300 and the spline seals 502, 504 in the band segments 603 of the axial flow turbomachine 100 of FIGS. 6, 7, and/or 8. In FIG. 9, the side view 900 is of an interior surface of the band segments 603 of the axial flow turbomachine 100. In FIG. 9, the first segment of the Z-seal 302 overlaps the tabs 406, 408 of the first spline seal 502 and the second segment of the Z-seal 304 overlaps the tabs 406, 408 of the second spline seal 504. In some examples, the midsection of the Z-seal 306 separates the first spline seal 502 and the second spline seal 504. In some examples, the midsection of the Z-seal 306 maintains a minimum distance between the first and second spline seals 502, 504.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that provide a seal between band segments of an axial flow turbomachine. In some examples, a first sealing element is disposed at a first angle, a second sealing element is disposed at a second angle, and a third sealing element includes segments disposed at the first angle and the second angle to connect and/or engage with the first and second sealing elements. In some examples, the first, second, and third sealing elements seal a segmented flow path that includes a curvature. In some examples, a plurality of the first, second, and third sealing elements is positioned between band segments bordering a flow path of the axial flow turbomachine to seal the flow path of the combustion gases and increase the power output, the fuel efficiency, and/or the overall efficiency of the axial flow turbomachine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Further aspects of the invention are provided by the subject matter of the following clauses:

1. An axial flow turbomachine comprising: band segments bordering a flow path of the axial flow turbomachine; a first spline seal disposed at a first angle within a first slot of the band segments; a second spline seal disposed at a second angle within a second slot of the band segments; and a Z-seal disposed across a space between the first slot and the second slot of the band segments, the Z-seal positioned at least partially within the first slot and the second slot of the band segments, the Z-seal including: a first segment disposed at the first angle at least partially within the first slot, the first segment to contact the first spline seal; and a second segment disposed at the second angle at least partially within the second slot, a portion of the second segment in connection with a portion of the first segment, the second segment to contact the second spline seal.

2. The axial flow turbomachine of any preceding clause, further including a first tab extending from a longitudinal end of the first spline seal and a second tab extending from a longitudinal end of the second spline seal.

3. The axial flow turbomachine of any preceding clause, wherein the first tab is to retain a position of the first spline seal within the first slot of the band segments of the axial flow turbomachine.

4. The axial flow turbomachine of any preceding clause, wherein the second tab is to retain a position of the second spline seal within the second slot of the band segments of the axial flow turbomachine.

5. The axial flow turbomachine of any preceding clause, wherein the first spline seal conforms to a sealing surface of the first slot, the second spline seal conforms to a sealing surface of the second slot, and the Z-seal conforms to a sealing surface of the space between the first slot and the second slot of the band segments in response to a pressure load during operation of the axial flow turbomachine.

6. The axial flow turbomachine of any preceding clause, wherein the first spline seal, the second spline seal, and the Z-seal are disposed between a first band segment and a second band segment of the axial flow turbomachine.

7. The axial flow turbomachine of any preceding clause, wherein the first band segment and the second band segment are coupled to at least one of a turbine nozzle, guide vanes, or stator vanes of the axial flow turbomachine.

8. The axial flow turbomachine of any preceding clause, wherein the Z-seal is positioned at least partially between (1) an interior of the band segments or the flow path of the axial flow turbomachine and (2) the first spline seal and the second spline seal.

9. The axial flow turbomachine of any preceding clause, wherein the Z-seal further includes a midsection including an angle based on the first angle of the first slot and the second angle of the second slot.

10. The axial flow turbomachine of any preceding clause, wherein the Z-seal includes at least one of a nickel-based alloy or a cobalt-based alloy.

11. A sealing apparatus comprising: a first sealing element disposed at a first angle; a second sealing element disposed at a second angle; and a third sealing element including a first segment and a second segment, a portion of the first segment in connection with a portion of the second segment, the first segment disposed at the first angle to contact the first sealing element, the second segment disposed at the second angle to contact the second sealing element.

12. The sealing apparatus of any preceding clause, wherein at least one of the first sealing element, the second sealing element, or the third sealing element include at least one of a nickel-based alloy or a cobalt-based alloy.

13. The sealing apparatus of any preceding clause, wherein a longitudinal end of the first sealing element and a longitudinal end of the second sealing element include a first surface to retain a position of the first sealing element and the second sealing element.

14. The sealing apparatus of any preceding clause, wherein the longitudinal end of the first sealing element and the longitudinal end of the second sealing element include a second surface to prevent contact between the first sealing element and the second sealing element.

15. The sealing apparatus of any preceding clause, wherein the first surface of the longitudinal end of the first sealing element or the second sealing element extends farther in a longitudinal direction than the second surface of the longitudinal end of the first sealing element or the second sealing element.

16. The sealing apparatus of any preceding clause, wherein the second surface of the longitudinal end of the first sealing element aligns with the second surface of the longitudinal end of the second sealing element.

17. The sealing apparatus of any preceding clause, wherein the third sealing element is positioned underneath the first sealing element and the second sealing element.

18. The sealing apparatus of any preceding clause, wherein the first sealing element, the second sealing element, and the third sealing element provide a seal between a first structure and a second structure, the first structure and the second structure including curvature.

19. A sealing apparatus of an axial flow turbomachine comprising: first means for sealing within a first slot, the first slot disposed at a first angle; second means for sealing within a second slot, the second slot disposed at a second angle; and third means for sealing within a gap between the first slot and the second slot, the third means for sealing including a first segment disposed at the first angle and a second segment disposed at the second angle, the first segment positioned at least partially within the first slot to contact the first means for sealing, the second segment positioned at least partially within the second slot to contact the second means for sealing.

20. The sealing apparatus of the axial flow turbomachine of any preceding clause, further including: first means for retaining to retain a position of the first means for sealing; second means for retaining to retain a position of the second means for sealing; and third means for retaining to retain a position of the third means for sealing.

What is claimed is:
1. An axial flow turbomachine comprising:
band segments bordering a flow path of the axial flow turbomachine;
a first spline seal disposed at a first angle within a first slot of the band segments, the first spline seal including a first tab protruding from a first longitudinal end of the first spline seal to retain a position of the first spline seal within the first slot;
a second spline seal disposed at a second angle within a second slot of the band segments; and a Z-seal disposed across a space between the first slot and the second slot of the band segments, the Z-seal including:
  a first segment disposed at the first angle at least partially within the first slot, the first segment to contact the first tab; and
  a second segment disposed at the second angle at least partially within the second slot, a portion of the second segment in connection with a portion of the first segment, the second segment to contact the second spline seal.

2. The axial flow turbomachine of claim 1, further including a second tab extending from a longitudinal end of the second spline seal to retain a position of the second spline seal within the second slot.

3. The axial flow turbomachine of claim 2, wherein the second tab is to retain a position of the second spline seal within the second slot of the band segments of the axial flow turbomachine.

4. The axial flow turbomachine of claim 1, wherein the first spline seal conforms to a sealing surface of the first slot, the second spline seal conforms to a sealing surface of the second slot, and the Z-seal conforms to a sealing surface of the space between the first slot and the second slot of the band segments in response to a pressure load during operation of the axial flow turbomachine.

5. The axial flow turbomachine of claim 1, wherein the first spline seal, the second spline seal, and the Z-seal are disposed between a first band segment and a second band segment of the axial flow turbomachine.

6. The axial flow turbomachine of claim 5, wherein the first band segment and the second band segment are coupled to at least one of a turbine nozzle, guide vanes, or stator vanes of the axial flow turbomachine.

7. The axial flow turbomachine of claim 1, wherein the Z-seal is positioned at least partially between (1) an interior of the band segments or the flow path of the axial flow turbomachine and (2) the first spline seal and the second spline seal.

8. The axial flow turbomachine of claim 1, wherein the Z-seal further includes a midsection including an angle based on the first angle of the first slot and the second angle of the second slot.

9. The axial flow turbomachine of claim 1, wherein the Z-seal includes at least one of a nickel-based alloy or a cobalt-based alloy.

10. The axial flow turbomachine of claim 1, wherein the space between the first slot and the second slot has a smaller width than at least a portion of the first slot.

11. A sealing apparatus comprising:
  a first sealing element disposed at a first angle;
  a second sealing element disposed at a second angle; and
  a third sealing element including a midsection, a first segment, and a second segment, the midsection in connection with a portion of the first segment and a portion of the second segment, the first segment disposed at the first angle to contact the first sealing element, the second segment disposed at the second angle to contact the second sealing element, wherein widths of the first segment and the second segment are greater than a width of the midsection, a longitudinal end of the first sealing element and a longitudinal end of the second sealing element include first surfaces to retain a position of the first sealing element and the second sealing element, the longitudinal end of the first sealing element and the longitudinal end of the second sealing element including second surfaces to prevent contact between the first sealing element and the second sealing element, wherein the first sealing element, the second sealing element, and the third sealing element are disposed between a first band segment and a second band segment of an axial flow turbomachine.

12. The sealing apparatus of claim 11, wherein at least one of the first sealing element, the second sealing element, or the third sealing element include at least one of a nickel-based alloy or a cobalt-based alloy.

13. The sealing apparatus of claim 11, wherein the longitudinal ends of the first sealing element and the second sealing element include third surfaces to retain a position of the first sealing element and the second sealing element.

14. The sealing apparatus of claim 11, wherein the first surface of the longitudinal end of the first sealing element or the second sealing element extends farther in a longitudinal direction than the second surface of the longitudinal end of the first sealing element or the second sealing element.

15. The sealing apparatus of claim 11, wherein the second surface of the longitudinal end of the first sealing element aligns with the second surface of the longitudinal end of the second sealing element.

16. The sealing apparatus of claim 11, wherein the third sealing element is positioned underneath the first sealing element and the second sealing element.

17. The sealing apparatus of claim 11,
  wherein the first band segment and the second band segment include curvature.

18. A sealing apparatus of an axial flow turbomachine comprising:
  first means for sealing within a first slot, the first slot disposed at a first angle;
  second means for sealing within a second slot, the second slot disposed at a second angle;
  third means for sealing within a gap between the first slot and the second slot, the third means for sealing including a first segment disposed at the first angle and a second segment disposed at the second angle, the first segment positioned at least partially within the first slot to contact the first means for sealing, the second segment positioned at least partially within the second slot to contact the second means for sealing;
  first means for retaining to retain a position of the first means for sealing, the first means for retaining extending into a first bend in the first slot; and
  second means for retaining the third means for sealing in the gap, the second means for retaining including a first portion extending from the first segment and a second portion extending from the second segment, the first portion of the second means for retaining extending into the first bend in the first slot, the second means for retaining in contact with the first means for retaining in the first bend in the first slot.

19. The sealing apparatus of the axial flow turbomachine of claim 18, wherein the second portion of the second means for retaining extends into a second bend in the second slot, further including third means for retaining to retain a position of the second means for sealing, the third means for retaining in contact with the second means for retaining in the second bend in the second slot.

* * * * *